US006289702B1

(12) United States Patent
Heirbaut et al.

(10) Patent No.: US 6,289,702 B1
(45) Date of Patent: Sep. 18, 2001

(54) HETEROGENEOUS KNITTED FABRIC COMPRISING METAL FIBRES

(75) Inventors: Guido Heirbaut, Temse; Wim Van Steenlandt, Sint-Niklaas, both of (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/646,158

(22) PCT Filed: Mar. 5, 1999

(86) PCT No.: PCT/EP99/01765

§ 371 Date: Sep. 14, 2000

§ 102(e) Date: Sep. 14, 2000

(87) PCT Pub. No.: WO99/47738

PCT Pub. Date: Sep. 23, 1999

(30) Foreign Application Priority Data

Mar. 18, 1998 (BE) .................................................. 09800212

(51) Int. Cl.⁷ ........................................................ D04B 1/14
(52) U.S. Cl. .................................................. 66/202; 66/170
(58) Field of Search ................................. 66/169 R, 170, 66/202; 442/310, 316

(56) References Cited

U.S. PATENT DOCUMENTS 3,806,959 4/1974 Gross .................................... 5/334 R

FOREIGN PATENT DOCUMENTS

| 1011278 A3 | 7/1999 | (BE) . |
| 44 01 417 | 7/1994 | (DE) . |
| 94/01372 | 1/1994 | (WO) . |
| 94/01373 | 1/1994 | (WO) . |
| 97/04152 | 2/1997 | (WO) . |

*Primary Examiner*—Danny Worrell
(74) *Attorney, Agent, or Firm*—Foley & Lardner

(57) ABSTRACT

The heterogeneous knitted fabric comprises metal fibres and other fibres. The fabric has a single knitted layer structure in which yarns with a high metal fibre content are situated towards one surface and yarns with a low metal fibre content are situated towards the other surface.

20 Claims, No Drawings

HETEROGENEOUS KNITTED FABRIC COMPRISING METAL FIBRES

The present invention relates to a relatively thin, heterogeneous knitted fabric comprising metal fibres and other fibres in which, more specifically, the yarn composition of the zone bordering its one surface differs from that bordering its other surface. Provided that the other fibres can also resist extreme temperatures, the knitted fabrics can be used for applications in very cold or in very hot environments.

Custom-made heterogeneous knitted fabrics comprising metal fibre yarns are already known from the applicant's patent WO 94/01373. The knitting pattern may hereby differ in predetermined zones over their surface, and/or through the thickness of the cloth. Patent WO 94/01372 also describes the application of this sort of heterogeneous fabric as separation cloth in the moulding of plate glass at high temperature. There is also an ever-increasing demand, in such production and in other applications, for relatively thin heterogeneous knitted fabrics comprising metal fibres that combine a relatively high air permeability with some measure of insulating capacity. The weight of such fabrics will preferably be kept to a minimum, despite the necessary proportion of contained metal fibres.

The heterogeneous knitted fabric comprising metal fibre according to the present invention attempts to meet this requirement by providing a plain flat knitted structure in which yarns having a high metal fibre content are present near the one surface, while yarns having a low metal fibre content are present near the other. The expression "high metal fibre content" is here to be understood to mean at least 30% metal fibres by volume, preferably more than 40% by volume, and even yarns consisting of 100% metal fibre. "Low metal fibre content" is here to be understood to mean less than 12% metal fibre by volume and, preferably, less than 7% by volume. The low-content yarn may even consist 100% of other fibres. These may be carbon, glass, basalt, ceramic or synthetic fibres. The knitted fabric generally weighs less than 2000 $g/m^2$ and, preferably, will be of a weight of less than 1500 $g/m^2$.

In order to procure the best possible fabric density (air permeability), the yarns bordering one surface, and those bordering the other surface (see overleaf) will preferably be oriented in parallel—according to the same knitting pattern—and be contiguous with each other. They behave, so to speak, as twin yarns, and can be plain flat knitted, as weft thread on a circular knitting machine or on a flat knitting machine. The machine separation can, depending amongst other things on yarn thickness, be optionally between 5 and 30 gauge for round knitting and between 5 and 20 gauge for flat knitting. The yarns having a high and those having a low metal fibre content are thus simultaneously drawn in for knitting towards the same needle, each placed under sufficient tension to form a flat-knit fabric (single stitch layer) in which one of the yarns always passes in front of the other, known as plating technique. The yarns with a low metal fibre content are usually smoother than those with a high metal fibre content. This facilitates the flat knitting operation.

The yarns with a high metal fibre content are, preferably, staple fibre yarns in which the metal fibres, for example stainless steel fibres, have a diameter of between 4 $\mu$m and 50 $\mu$m. The yarns on the opposite side of the cloth may be filament yarns of 100% glass, basalt or carbon or synthetic filaments with a diameter below 40 $\mu$m. Suitable synthetic filaments include polyaramid or polyimide filaments (Kevlar (R)), brand name of du Pont de Nemours, Twaron (R), brand name of AKZO/ENKA). Spun yarns, whether or not twisted yarn consisting of one or more sorts of fibre, are equally suitable.

During the flat knitting process, one type of yarn (with high metal fibre content) can be used as well as another (with little or no metal fibres) so as to produce a fabric with zones presenting knitting patterns over its surface with differing weight per $m^2$, density (air permeability), stretchability or electrical conductivity. The fabric may also contain a fine interlining yarn, e.g., to reinforce the fabric as described in the applicant's Belgian patent appli-cation 97/00614. Finally, a single layer fabric zone as described above can be incorporated locally within a surroun-ding—e.g. double layer—knitted structure on a flat knit-ting machine. This then produces a knitted fabric containing the relatively thin heterogeneous knitted fabric over part of its surface. The cloth is thus heterogeneous through its thickness as well as over its surface.

EXAMPLE

By way of example, one embodiment of the knitted fabric according to the present invention and its application as a separation cloth in the compression moulding of plate glass will now be explained in further detail. The invention is not, however, limited to this or to analogous embodiments. The cloth was fabricated at a pitch of 12 gauges on a Stoll CMS 440 flat knitting machine to a single Jersey structure without thin interlining stiffening yarn. After removal of all brightening agents from the cloth, the cloth thickness was approximately 1 mm. The cloth counted 62.5 stitches per $cm^2$ and had a weight of 980 $g/m^2$. This cloth displayed an air permeability (l/h/10 $cm^2$) of 4164 and was therefore suitable as lining for the male section of the compression mould. The glass fibre surface of the cloth was in contact with the mould, the metal fibre outer surface thus forming the contact with the glass plate during moulding.

In this separation cloth, the spun (staple fibre) high metal-fibre-content yarns consisted of 100% Bekinox type AISI 316 L fibres with a diameter of 12 $\mu$m and measuring 133 tex. The low metal-fibre-content yarn consisted of a 100% glass filament yarn measuring 136 tex.

If a heterogeneous knitted fabric according to the present invention forms a burner membrane for gas burners, coarse yarns are used. Separation on the knitting machine can be set at, e.g., 5. A 100% metal filament yarn as described in the applicant's patent WO 97/04152 is fitted at the gas outlet side (burner face) of the membrane.

The layer fitted at the gas supply side of the cloth may be, e.g., 100% glass yarn or ceramic yarn. The heterogeneous knitted fabric according to the present invention can also be used as a heat shield against oven heat or as electromagnetic shielding cloth. Polishing cloth can also be fabricated according to the invention, with abrasion-resistant metal fibre yarns on the polishing side. It is further possible to imbed the heterogeneous knitted fabric in a plastic matrix. The proportion of other fibres will then preferably comprise synthetic fibres capable of combining with the plastic of the mould.

What is claimed is:

1. Heterogeneous knitted fabric having two surfaces and comprising:

metal fibres and other fibres, said knitted fabric having a single layer knitted structure comprising yarns comprising a high content of said metal fibres, said single layer knitted structure comprising yarns comprising a low content of said metal fibres, said yarns comprising a high metal fibre content being present near one of said surfaces of said knitted fabric, said yarns comprising a low metal fibre content being present near the other of said surfaces of said knitted fabric.

2. A heterogeneous knitted fabric according to claim 1, wherein said heterogeneous knitted fabric is circulary knitted with machine separation between 5 and 30 gauge.

3. A heterogeneous knitted fabric according to claim 1, wherein said heterogenous knitted fabric is flat knitted with machine separation between 5 and 20 gauge.

4. A heterogeneous knitted fabric according to claim 1, weighing less than 1500 g/m$^2$.

5. A heterogeneous knitted fabric according to claim 1, wherein the other fibres comprise glass fibres.

6. A heterogeneous knitted fabric according to claim 1, wherein the other fibres comprise basalt fibres.

7. A heterogeneous knited fabric according to claim 1, wherein the other fibres comprise synthetic fibres.

8. A heterogeneous knited fabric according to claim 1, further comprising a fine multifilament liner yarn.

9. A heterogeneous fabric according to claim 1, wherein the heterogeneous knitted fabric is formed on at least one of its surfaces.

10. A method of compression moulding of a glass plate, comprising the steps of:

providing a compression mould, comprising a male mould; and lining said male mould with a knitted fabric as in claim 3.

11. A burner membrane for gas burners, comprising a heterogenous knitted fabric as set forth in claim 1.

12. A burner membrane for gas burners, comprising a heterogenous knitted fabric as set forth in claim 3.

13. A burner membrane for gas burners, comprising a heterogenous knitted fabric as set forth in claim 4.

14. A burner membrane for gas burners, comprising a heterogenous knitted fabric as set forth in claim 5.

15. A burner membrane for gas burners, comprising a heterogenous knitted fabric as set forth in claim 6.

16. A burner membrane for gas burners, comprising a heterogenous knitted fabric as set forth in claim 7.

17. A burner membrane for gas burners, comprising a heterogenous knitted fabric as set forth in claim 8.

18. A burner membrane for gas burners, comprising a heterogenous knitted fabric as set forth in claim 9.

19. A heterogeneous knitted fabric having two surfaces and comprising:

metal fibres; and other fibres;

said knitted fabric having a single layer knitted structure comprising yarns having a high content of said metal fibres, said single layer knitted structure comprising yarns having a low content of said metal fibres, said yarns having a high metal fibre content being present near one of said surfaces of said knitted fabric, said yarns having a low metal fibre content being present near the other of said surfaces of said knitted fabric, said yarns having a high content of said metal fibres comprising at least 30% by volume of said metal fibres, and said yarns having a low content of said metal fibres, comprising less than 12% by volume of said metal fibres.

20. A burner membrane for gas burners, comprising a heterogenous knitted fabric as set forth in claim 2.

* * * * *